United States Patent [19]
Bachofer

[11] 3,971,249
[45] July 27, 1976

[54] MECHANICAL TESTING SYSTEM

[75] Inventor: Henry L. Bachofer, Newtown Square, Pa.

[73] Assignee: Sun Oil Company of Pennsylvania, Philadelphia, Pa.

[22] Filed: Mar. 28, 1975

[21] Appl. No.: 563,019

[52] U.S. Cl. .................................. 73/67; 73/71.4
[51] Int. Cl.$^2$ ............................... G01H 1/08
[58] Field of Search ............... 73/67, 71.4, 71.2, 69; 340/261

[56] References Cited
UNITED STATES PATENTS

| | | | |
|---|---|---|---|
| 3,095,730 | 7/1963 | Matheson | 73/67 |
| 3,677,072 | 7/1972 | Weichbrodt et al. | 73/67 |
| 3,694,637 | 9/1972 | Edwin et al. | 73/67 |
| 3,699,806 | 10/1972 | Weichbrodt | 73/71.4 |
| 3,745,815 | 7/1973 | Bentone et al. | 73/71.4 |
| 3,842,663 | 10/1974 | Harting et al. | 73/71.4 |

*Primary Examiner*—Richard C. Queisser
*Assistant Examiner*—Stephen A. Kreitman
*Attorney, Agent, or Firm*—J. Edward Hess; Donald R. Johnson; William C. Roch

[57] ABSTRACT

A system for diagnosing the condition of mechanical equipment, and particularly the condition of bearings in rotating machinery. Vibrations from the mechanical equipment are detected by a wide range acoustical detector. A sweep voltage generator causes a voltage controlled oscillator to scan through a bandwidth of interest. A synchronous detector receives inputs from the acoustical detector and the voltage controlled oscillator, and produces an output whenever the frequencies of the two signals match. A recorder having inputs from the synchronous detector and the sweep voltage generator charts the amplitude of the detected vibrations as a function of frequency. After a period of time has elapsed and it is desired to check the condition of the bearings, a second recording of amplitude of detected vibrations versus frequency is taken. The first and second recordings are then visually compared for significant differences which would indicate changing operating conditions of the bearings.

1 Claim, 1 Drawing Figure

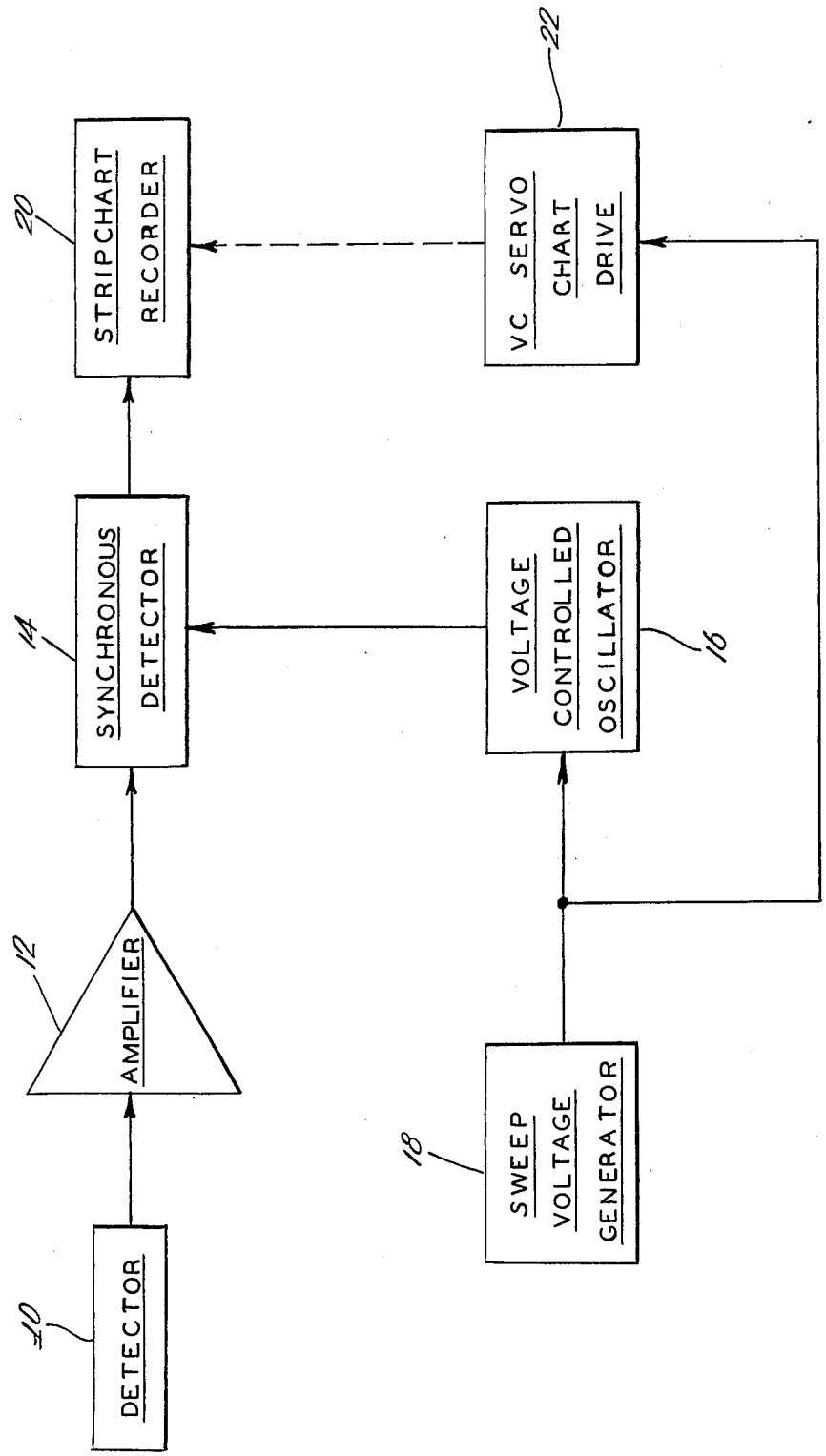

MECHANICAL TESTING SYSTEM

BACKGROUND OF THE INVENTION

The present invention relates generally to a system for checking the condition of mechanical equipment, and in particular relates to a system for checking the condition of bearings in rotating machinery. As the bearing surfaces deteriorate over a period of time the change in performance of the bearings should be detectable from the sounds emanating therefrom. The present invention takes advantage of that fact in providing a system for checking the condition of bearings which does not require disassembly of the machinery for an actual physical examination of the bearings.

It has been known and recognized in the art that the analysis of vibrations in mechanical equipment is a valuable diagnostic tool for determining the mechanical condition of the equipment. Although this concept has been recognized in the art, it appears that a general system for comprehensively checking the mechanical condition of machines has not been fully developed.

SUMMARY OF THE INVENTION

In accordance with a preferred embodiment, a system is disclosed for checking the condition of mechanical equipment in which vibrations in the equipment are detected within a given bandwidth. The frequencies of the detected vibrations are systematically scanned through the bandwidth, and the amplitudes of detected vibrations are recorded as a function of frequency, such that the recording of amplitude versus frequency defines the operating characteristics of the equipment at that time. In a like manner a second recording is taken at a later period of time, and the first and second recirdings are then compared. Significant differences between the recordings would indicate a change in the mechanical condition of the equipment during the time between the first and second recordings.

BRIEF DESCRIPTION OF THE DRAWING

Referring to the FIGURE, there is illustrated a block diagram of a preferred embodiment of the invention.

DESCRIPTION OF A PREFERRED EMBODIMENT

Referring to the FIGURE, there is illustrated a block diagram of one embodiment of an electronic system for checking the condition of mechanical equipment, and particularly the condition of bearings in rotating machinery. A wide range acoustic detector 10, having a bandwidth from one to one hundred kilohertz, is positioned either directly on or adjacent to the mechanical equipment being checked. The output of the detector 10 is amplified in an amplifier 12 to a level sufficient to operate a synchronous detector 14. The synchronous detector 14 receives a second input from a voltage controlled oscillator 16 which is caused to sweep over the bandwidth of one to one hundred kilohertz by a ramp voltage produced by sweep voltage generator 18. As is known in the art, the synchronous detector produces an output signal whenever the frequency of the signal from the oscillator 16 matches the frequency of a signal detected by detector 10, and the amplitude of the output signal is proportional to the amplitude of the detected signal. A strip-chart recorder 20 is provided to record the output of the system. The sweep voltage from generator 18 is also directed as an input to a voltage controlled servo chart drive 22. As the amplitude of the sweep voltage, which is proportional to the frequency produced by oscillator 16, is changed the servo chart drive 22 changes the position of the recorder along the abscissa of the chart. The result is a chart with frequency defined by the abscissa and amplitude of vibration defined by the ordinate. In this way, a "fingerprint" of the mechanical condition of the equipment is developed.

After the mechanical equipment has been operating for some period of time, after which a check on the mechanical condition of the equipment is desired, a second recording of the vibrations in the equiipment is produced. The first and second recordings are then visually compared to determine if there has been a significant change in the vibration characteristics of the machinery which would indicate that components within the machinery have altered in the manner in which they are performing.

Although a particular bandwidth has been given in the preferred embodiment, in other embodiments other bandwidths may be desired depending upon the type of equipment being checked.

Although a preferred embodiment of the present invention has been described, the teachings of this invention will suggest many other embodiments to those skilled in the art.

The invention claimed is:

1. A system for checking the condition of mechanical apparatus and comprising:
   a. means for detecting vibrations in the mechanical apparatus within a given bandwidth;
   b. means for systematically scanning through the frequencies of the detecting vibrations in said bandwidth and including a variable frequency, voltage controlled oscillator, the output frequency of which may be controlled by an input voltage signal to cause it to scan through said bandwidth, means for producing a sweep voltage for driving said voltage controlled oscillator through said bandwidth, and a synchronous detector means, coupled with said detecting means and said variable frequency, voltage controlled oscillator, for detecting when the frequency of said variable frequency oscillator matches the frequency of a vibration detected by said detecting means, whereby as said variable frequency oscillator is scanned through the bandwidth said synchronous detector means will produce an output whenever the frequency of said variable frequency oscillator matches the frequency of a vibration detected by said detecting means; and
   c. means, coupled to said synchronous detector means and said means for producing a sweep voltage, for recording the amplitude of the output of said synchronous detector means as a function of the frequency of said voltage controlled oscillator, whereby the recording of amplitude versus frequency may be utilized to diagnose the condition of the mechanical apparatus.

\* \* \* \* \*